United States Patent
Henry

(10) Patent No.: US 7,091,849 B1
(45) Date of Patent: Aug. 15, 2006

(54) INBOUND INTERFERENCE REDUCTION IN A BROADBAND POWERLINE SYSTEM

(75) Inventor: Paul Shala Henry, Holmdel, NJ (US)

(73) Assignee: AT&T Corp., New York, NY (US)

( * ) Notice: Subject to any disclaimer, the term of this patent is extended or adjusted under 35 U.S.C. 154(b) by 198 days.

(21) Appl. No.: 10/840,096

(22) Filed: May 6, 2004

(51) Int. Cl.
*G08B 1/08* (2006.01)

(52) U.S. Cl. .......................... 340/538.12; 340/310.13; 375/318; 333/124

(58) Field of Classification Search ............ 340/538.12
See application file for complete search history.

(56) References Cited

U.S. PATENT DOCUMENTS

| | | | |
|---|---|---|---|
| 4,602,240 A * | 7/1986 | Perkins et al. ................. | 307/3 |
| 5,684,450 A | 11/1997 | Brown | |
| 5,847,447 A | 12/1998 | Rozin et al. | |
| 5,864,284 A | 1/1999 | Sanderson | |
| 5,929,750 A | 7/1999 | Brown | |
| 5,933,071 A | 8/1999 | Brown | |
| 5,949,327 A | 9/1999 | Brown | |
| 5,952,914 A | 9/1999 | Wynn | |
| 5,982,276 A | 11/1999 | Stewart | |
| 6,040,759 A | 3/2000 | Sanderson | |
| 6,137,412 A | 10/2000 | Herzer | |
| 6,141,634 A | 10/2000 | Flint et al. | |
| 6,144,292 A | 11/2000 | Brown | |
| 6,157,292 A | 12/2000 | Piercy et al. | |
| 6,172,597 B1 | 1/2001 | Brown | |
| 6,173,021 B1 * | 1/2001 | Bingel et al. ................ | 375/346 |
| 6,282,405 B1 | 8/2001 | Brown | |
| 6,297,729 B1 | 10/2001 | Abali et al. | |
| 6,297,730 B1 | 10/2001 | Dickinson | |
| 6,313,738 B1 * | 11/2001 | Wynn ............................. | 307/3 |
| 6,317,031 B1 | 11/2001 | Rickard | |
| 6,331,814 B1 | 12/2001 | Albano et al. | |
| 6,396,392 B1 | 5/2002 | Abraham | |
| 6,396,393 B1 | 5/2002 | Yuasa | |
| 6,404,773 B1 | 6/2002 | Williams et al. | |
| 6,417,762 B1 | 7/2002 | Comer | |
| 6,449,318 B1 | 9/2002 | Rumbaugh | |
| 6,452,482 B1 | 9/2002 | Cern | |
| 6,477,212 B1 * | 11/2002 | Bingel et al. ................ | 375/346 |
| 6,492,897 B1 | 12/2002 | Mowery, Jr. | |
| 6,496,104 B1 | 12/2002 | Kline | |
| 6,507,573 B1 | 1/2003 | Brandt et al. | |
| 6,515,485 B1 | 2/2003 | Bullock et al. | |

(Continued)

OTHER PUBLICATIONS

Broadband Powerline Communications Systems A Background Brief, Sep. 2003, Australian Communications Authority, Australia, Document SP Nov. 2003.

*Primary Examiner*—Jeffery Hofsass
*Assistant Examiner*—George Bugg
(74) *Attorney, Agent, or Firm*—Law Office of Jeffrey M. Weinick, LLC

(57) ABSTRACT

Disclosed is a method and apparatus for reducing inbound interference in a broadband powerline communication system. Data modulated on first and second carrier frequencies is received via respective first and second lines of the powerline system. A characteristic of at least one of the carrier signals (e.g., phase or amplitude) is adjusted at the receiver in order to reduce the effects of inbound interference on the transmission system. The adjustment parameters may be determined by adjusting the parameters, during a period of no data transmission, until the output of a differential receiver is zero.

13 Claims, 1 Drawing Sheet

U.S. PATENT DOCUMENTS

| | | |
|---|---|---|
| 6,522,626 B1 | 2/2003 | Greenwood |
| 6,549,120 B1 | 4/2003 | de Buda |
| 6,590,493 B1 | 7/2003 | Rasimas et al. |
| 6,646,447 B1 | 11/2003 | Cern et al. |
| 6,781,481 B1 * | 8/2004 | Richardson ............... 333/181 |
| 2001/0045888 A1 | 11/2001 | Kline |
| 2001/0052843 A1 | 12/2001 | Wiesman et al. |
| 2001/0054953 A1 | 12/2001 | Kline |
| 2002/0002040 A1 | 1/2002 | Kline et al. |
| 2002/0010870 A1 | 1/2002 | Gardner |
| 2002/0024423 A1 | 2/2002 | Kline |
| 2002/0027496 A1 | 3/2002 | Cern et al. |
| 2002/0049368 A1 | 4/2002 | Ritland |
| 2002/0075797 A1 | 6/2002 | Kilani |
| 2002/0095662 A1 | 7/2002 | Ashlock et al. |
| 2002/0097953 A1 | 7/2002 | Kline |
| 2002/0098867 A1 | 7/2002 | Meiksin et al. |
| 2002/0098868 A1 | 7/2002 | Meiksin et al. |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2003/0007576 A1 | 1/2003 | Alavi et al. |
| 2003/0160684 A1 | 8/2003 | Cern |
| 2003/0190110 A1 | 10/2003 | Kline |
| 2003/0201759 A1 | 10/2003 | Cern |
| 2003/0201873 A1 | 10/2003 | Cern |
| 2003/0210135 A1 | 11/2003 | Cern |
| 2003/0222747 A1 | 12/2003 | Perkinson et al. |
| 2003/0222748 A1 | 12/2003 | Cern et al. |
| 2003/0224784 A1 | 12/2003 | Hunt et al. |
| 2004/0032320 A1 | 2/2004 | Zalitzky et al. |

* cited by examiner

INBOUND INTERFERENCE REDUCTION IN A BROADBAND POWERLINE SYSTEM

CROSS REFERENCE TO RELATED APPLICATIONS

This application is related to commonly assigned patent application Ser. No. 10/839,945 filed concurrently herewith on May 6, 2004, entitled Outbound Interference Reduction in a Broadband Powerline System, which is incorporated herein by reference.

BACKGROUND OF THE INVENTION

This application relates generally to data transmission, and more particularly to data transmission over power lines.

The use of power lines to transmit data is known. Initially, powerline communication systems were limited to relatively low data rates, typically less than 500 kbs. These low data rates are generally useful for applications such as remote control of various switches connected to the powerline system. More recently, developments have been made in the area of broadband powerline communication systems, also known as powerline telecommunications (PLT) systems or broadband powerline (BPL) systems. These systems are capable of transmitting data at significantly higher data rates than previous systems. For example, BPL systems can transmit data at rates of 4–20 Mbps.

While existing powerline systems are capable of transmitting data at the rates described above, they were not initially designed for data transmission. Instead, they were designed to carry large currents at high voltages so that significant amounts of energy could be distributed at one primary low frequency (e.g., 60 Hertz).

Powerline communication systems generally use one or more carrier frequencies in order to spread the data transmission over a wider range of frequencies. The low data rate powerline communication systems discussed above generally utilized frequencies in the range of 9 kHz to 525 kHz. In these low data rate systems, the risk of interference from external radiation sources is low. The high data rates of BPL systems cannot be achieved using carrier frequencies below 525 kHz. Instead, BPL systems typically use carrier frequencies in the range of 1–30 MHz.

One of the problems with a BPL system is the detrimental effects of inbound interference from external electromagnetic radiators. The physical attributes of the power lines (e.g., high elevation and unshielded wiring) along with the higher carrier signal frequencies needed for high bandwidth data transmission, contribute to this interference problem.

BRIEF SUMMARY OF THE INVENTION

I have recognized that a power line acts as an antenna and may be modeled using antenna analysis techniques. This recognition has led to advantageous techniques for reducing the effects of inbound interference in a powerline communication system.

In accordance with one embodiment of the invention, signals are received on first and second lines of the powerline system. The signals comprise a modulated carrier signal component and an interference component. At least one characteristic of at least one of the first and second signals is adjusted in order to reduce the effects of inbound interference in the powerline system. The adjusted characteristic may be, for example, signal phase or signal amplitude.

In accordance with another embodiment of the invention, the powerline communication system is a frequency division multiplexed system transmitting data on a plurality of frequency channels and the signal characteristics are adjusted independently for each of the frequency channels.

In accordance with one embodiment of the invention, the adjustment settings are determined by adjusting the characteristics until the output of a differential receiver operating on the carrier signals is zero while there is no data transmission taking place in the powerline communication system.

These and other advantages of the invention will be apparent to those of ordinary skill in the art by reference to the following detailed description and the accompanying drawings.

DETAILED DESCRIPTION

Figure 1:
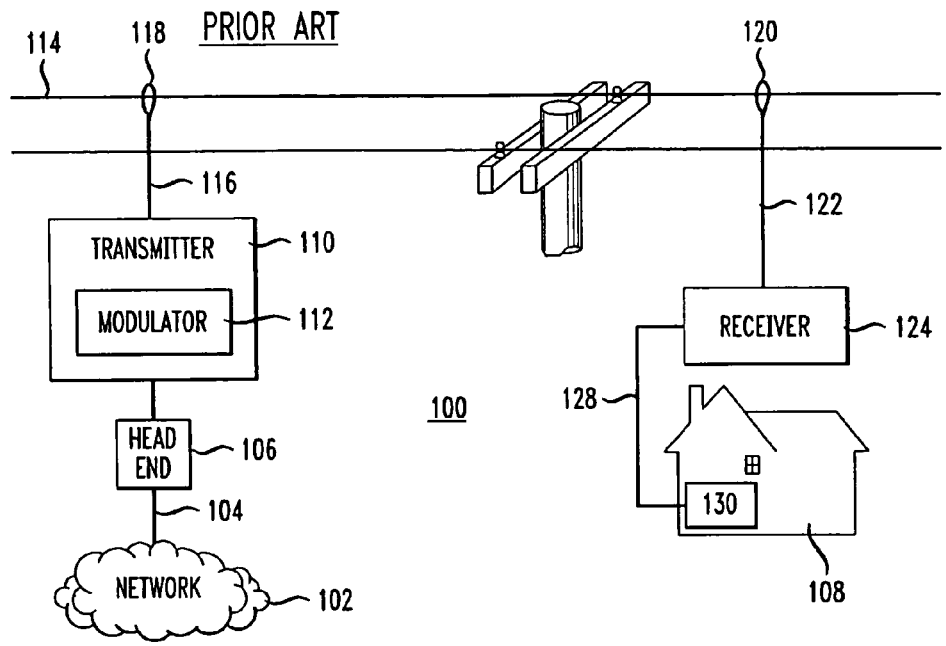
FIG. 1 shows a typical prior art powerline communication system.

A typical prior art powerline communication system 100 is shown in FIG. 1. A head end network node 106 is connected to a data network 102 via a fiber optic cable 104. In accordance with a typical network service, the head end 106 is configured to transmit data to end user premises (e.g., premises 108) using powerline cables as the transmission medium. The head end 106 is also configured to convert signals in the optical domain received from fiber 104 to the electrical domain using well known optical to electrical conversion techniques. The head end 106 is connected to a transmitter 110. The transmitter 110 contains a modulator 112 which modulates the data received from head end 106 onto a carrier signal using well known RF modulation techniques. As described above, typical carrier frequencies for a powerline communication system are in the range of 2–30 MHz. The modulated signal is provided to the powerline cable 114 via line 116 and coupler 118. A powerline communication system 100 of the type shown in FIG. 1 may use orthogonal frequency division multiplexing (OFDM) in which the available bandwidth is split up into multiple narrowband channels which do not interfere with each other. Thus, in accordance with OFDM transmission, multiple carrier signals, each having its own frequency band and representing a distinct data channel, are carried over the cable 114.

For purposes of the present description, it is assumed that the powerline cable 114 is a medium voltage (MV) powerline cable typically supplying power at 4–66 kV. Such medium voltage cable is typically an aluminum cable having a 1 cm diameter. Coupler 118 couples the modulated carrier signal supplied by line 116 to the MV line 114. Various types of couplers 118 are known in the art. For example, coupler 118 may be an inductive coupler, a capacitive coupler, or may employ direct metallic contact. The carrier signal is transmitted along the length of MV powerline cable 114 to coupler 120 which couples the signal from the MV powerline cable 114 to a receiver 124 via line 122.

The signal from receiver 124 is provided to the premises 108 via low voltage (LV) powerline 128. The low voltage powerline typically supply power at 100–240 volts. Thus, one of the functions of the receiver is to translate the data from the MV line to the LV line. The low voltage line is connected to a modem 130 within the premises 108. The modem 130 demodulates the signal received from the MV powerline cable 114 and extracts the data that was transmitted from the head end 106. It is noted that in particular embodiments, it is possible that the receiver 124 further functions to demodulate the data and deliver it to a second transmitter (not shown) that would re-modulate the data and send it to the premises 108.

It is noted that for ease of description only downstream (i.e., from head end to end user) data transmission is shown and described. One skilled in the art would readily recognize that upstream transmission could be accomplished in a similar manner.

As described above in the background section, one of the problems with powerline data transmission systems as shown in FIG. 1 is the effect of inbound interference. As such, the signal received by a receiver in a powerline system comprises a modulated carrier signal component and an interference component.

I have recognized that a MV powerline acts as an antenna and may be modeled using antenna analysis techniques. Using the assumptions described above, and depending upon the effective terminating impedance presented by the couplers, the MV line may be considered to be a dipole antenna (approximately several wavelengths long) or a traveling-wave (Beverage) antenna. In either case, the power line's ohmic resistance is less than 2 ohms, and so dissipation is negligible. The powerline wire radiates approximately half the power launched in each direction and makes the remaining half available at the termination points. For either the dipole or the traveling-wave antenna, the effective gain G of the wire is approximately 0–10 dB, depending upon the wavelength.

If P is the power launched onto the wire, then the Effective Isotropic Radiated Power (EIRP) is defined as $$EIRP \approx \left(\frac{P}{2}\right)G$$

In the United States, Part 15 of the Federal Communications Commission Rules, (47 CFR 15) sets forth the regulations under which an intentional, unintentional, or incidental radiator may be operated without an individual license. Under these rules, the upper limit on allowable launched power is give by:

$$\frac{EIRP}{4\pi r^2} < \frac{Emax^2}{Zfs}$$

where r=30 m, Emax=30 uV/m in 9 KHz and Zfs=377 ohms. For G=10, this puts an upper limit on launched power of Pmax=−52 dBm in a 9 KHz channel. See, e.g., 47 CFR 15.109, 15.209.

The lower limit on launched power is set by the interference environment. Assume, for example, that we want to protect against incoming interference with a margin of 10 dB. For strong interference, e.g., received level of S9 or −73 dBm, desired signal power at the receiver must be greater than −73 dBm+10 dB or −63 dBm, so the launched power must be greater than −60 dBm. (Since only about half of the launched power is available at the receiver). Thus, the launched power (in a 9 KHz slot) is bounded by:

−60 dBm<launched power<−52 dBm.

The above described model defines the basic constraint on the signal power levels in a BPL system. For reasonable system parameters, there is an operating window, within which it is possible to simultaneously satisfy the FCC requirements and also provide some margin against outside interference.

As described in co-pending patent application Ser No. 10/839,945 the key to reducing outbound interference effects of a BPL system is to reduce the gain G of the power lines which are acting as an antenna. Such a reduction in gain G has several benefits. For example, if G is reduced by 10 dB, then the signal power required at the receiver to maintain margin against a given outside interferer is reduced by a like amount, and thus the radiated interference is reduced by 20 dB. The above referenced related patent application describes that an advantageous technique for reducing G is to use a balanced transmission line, which may be achieved by using two wires and differential excitation. Balanced data transmission is well known in the art of data transmission, and generally requires at least two conductors per signal. The transmitted signal is referenced by the difference of potential between the lines, not with respect to ground. Thus, differential data transmission reduces the effects of noise, which is seen as common mode voltage (i.e., seen on both lines), not differential, and is rejected by differential receivers. In the simplest type of differential data transmission system, the same signal is transmitted via both transmission lines, with the phase of the signals being offset from each other by 180 degrees. More sophisticated differential systems allow for the adjustment of the relative phase and amplitude of the two transmitted signals. For an ideal balanced line, G=0 and there is no interference. For two parallel wires separated by a non-infinitesimal distance d, the field strength at a distance r is reduced by approximately d/r compared with the single-wire case. Thus for d=1 m and r=30 m, G is reduced by approximately 30 dB.

The realization that the powerline system may be modeled using antenna analysis techniques has led to the further realization that the effects of inbound interference in a powerline communication system may be reduced by applying signal adjustments at an adjustment module of a differential receiver.

Figure 2:
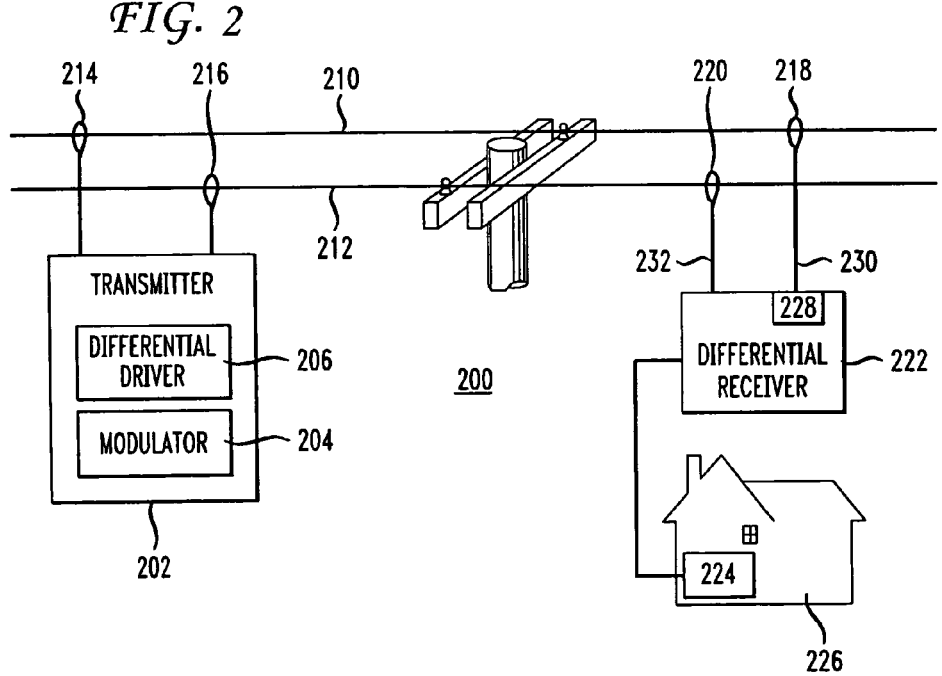
FIG. 2 shows a powerline communication system incorporating an embodiment of the invention.

A first embodiment of the present invention is shown in FIG. 2. FIG. 2 shows a powerline communication system 200 comprising a transmitter 202 coupled to a first powerline cable 210 and a second powerline cable 212 via couplers 214 and 216 respectively. As described in conjunction with transmitter 110 of FIG. 1, transmitter 202 encodes data received from a network node (e.g., a head end 106 as shown in FIG. 1) for transmission via the power lines. The transmitter 202 contains a modulator 204 for modulating a carrier signal with the data to be transmitted using well known modulation techniques. The embodiment shown in FIG. 2 uses differential data transmission whereby a first carrier signal is modulated and coupled to power line 210 via coupler 214 and a second carrier signal is modulated and coupled to power line 212 via coupler 216. The signals are received via couplers 218 and 220 which are connected to a differential receiver 222. Differential receiver 222 responds to the difference between the signals receive via coupler 218 and 220, and transmits the difference signal to a modem 224 within the premises 226. The modem 224 demodulates the signal received from the MV power lines to extract the transmitted data.

In accordance with known differential data transmission techniques, both carrier signals have the same frequency and are modulated with the same data, but the carrier signals are transmitted having different phases. In accordance with known differential data transmission techniques, the carrier signals would be out of phase with each other by 180 degrees.

Due to the possibility of external interference, the signal received at differential receiver 222 may be degraded due to such interference. As such, the signals receive via couplers 218 contain a modulated carrier signal component as well as an interference component. In accordance with one embodiment of the invention, an adjustment module 228 is used in connection with differential receiver 222. The adjustment module 228 is configured to adjust the characteristics of the signal received on line 230 in order to remove or reduce the overall inbound interference effects. Such characteristics may be, for example, the phase or amplitude of the received signal. In accordance with one embodiment, the adjustment module is configured as follows. First, all transmitters in the system stop transmitting. Therefore, any signal received at differential receiver 222 will be the result of an external interference source. The adjustment module 228 then adjusts at least one characteristic of the signal on line 230 in order to produce a zero output from the differential receiver 222. At the point where zero output is received from the differential receiver, the adjustment parameters of the adjustment module are recorded. The adjustment parameters may be, for example, the phase and/or amplitude adjustment being applied by the adjustment module. These adjustment parameters are the parameters required in order to remove the effect of the external source of interference. These same adjustment parameters are then used during data transmission, such that the adjustment parameters will continue to remove the effects of the external interference source. One skilled in the art would readily recognize that the adjustment module 228 could adjust the characteristics of the carrier signal received on line 232 instead of line 230. In yet other embodiments, the adjustment module 228 could be configured to adjust the characteristics of the carrier signals received on both lines 230 and 232.

The adjustment parameters may also be determined while data is being transmitted if the characteristics of the interference are known (i.e., the interference has a known signature). In such a case, the adjustment module adjusts at least one characteristic of the received signal until the interference is removed. At the point where the known interference signal is removed, the adjustment parameters of the adjustment module are recorded and used as described above.

The embodiment shown in FIG. 2 is particularly advantageous when OFDM data transmission is utilized, because each frequency channel may be individually adjusted in order to remove the external interference source. In such an embodiment, the adjustment module 228 adjusts the signal characteristics of each narrowband carrier signal individually, because the external interference may affect different frequency channels in the OFDM system differently.

The above described embodiment assumes that the external interference source is constant over some time period. In various embodiments, the transmitters of the powerline communication system could stop transmitting periodically in order to allow the adjustment module 228 to readjust its settings in order to deal with varying interference sources over time. When the transmitters stop transmitting, the adjustment module 228 performs the above described steps for setting its adjustment parameters.

In another possible embodiment of the invention, the differential receiver could be manually preconfigured in order to deal with a known external interference source. One skilled in the art would recognize that many variations are possible. For example, if the interfering signal source has known signature, then the adjustment module could be configured to reduce interference based on the signature. For example, the interfering source may only transmit periodically at known times, in which case the adjustment module would be configured to adjust the incoming signal appropriately only when the interfering signal source is transmitting. In yet another alternative, the signature could be determined dynamically as well.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

The invention claimed is:

1. A method for reducing the effects of inbound interference in a powerline transmission system comprising the steps of:
   receiving a first signal on a first line of said transmission system, said first signal comprising a modulated carrier signal component and an interference component;
   receiving a second signal on a second line of said transmission system, said second signal comprising a modulated carrier signal component and an interference component;
   adjusting at least one characteristic of at least one of said first and second signals to reduce the effects of external interference on said transmission system; and determining adjustment parameters by adjusting said at least one characteristic of at least one of said first and second signals until the output of a differential receiver operating on said first and second signals is zero.

2. The method of claim 1 wherein said step of determining adjustment parameters is performed during a time period when data is not being transmitted via said powerline transmission system.

3. The method of claim 1 wherein said step of determining adjustment parameters is performed during a time period when data is being transmitted via said powerline transmission system.

4. The method of claim 1 wherein said at least one characteristic is signal phase.

5. The method of claim 1 wherein said at least one characteristic is signal magnitude.

6. The method of claim 1 wherein said powerline communication system is a frequency division multiplexed system transmitting data on a plurality of frequency channels.

7. The method of claim 6 wherein said step of adjusting is performed independently for each of said frequency channels.

8. Apparatus for reducing the effects of inbound interference in a powerline transmission system comprising:
   means for receiving a first signal on a first line of said transmission system, said first signal comprising a modulated carrier signal component and an interference component;
   means for receiving a second signal on a second line of said transmission system, said second signal compris ing a modulated carrier signal component and an interference component;

an adjustment module for adjusting at least one characteristic of at least one of said first and second signals to reduce the effects of external interference on said transmission system; and means for determining adjustment parameters by adjusting said at least one characteristic of at least one of said first and second signals until the output of a differential receiver operating on said first and second signals is zero.

9. The apparatus of claim 8 wherein said at least one characteristic is signal phase.

10. The apparatus of claim 8 wherein said at least one characteristic is signal magnitude.

11. The apparatus of claim 8 wherein said powerline communication system is a frequency division multiplexed system transmitting data on a plurality of frequency channels.

12. A powerline communication system comprising:
a first transmission line;
a second transmission line;
at least one receiver for receiving first and second modulated carrier signals via said first and second transmission lines respectively;
an adjustment module for adjusting at least one characteristic of at least one of said first and second carrier signals to reduce the effects of external interference on said transmission system; wherein adjustment parameters are determined by adjusting said at least one characteristic of at least one of said first and second carrier signals until the output of a differential receiver operating on said first and second carrier signals is zero.

13. The powerline communication system of claim 12 wherein said at least one receiver is a differential receiver.

* * * * *